United States Patent [19]

Iwata et al.

[11] Patent Number: 5,464,282
[45] Date of Patent: Nov. 7, 1995

[54] SCREW FOR DOUBLE-SHAFT EXTRUDING DEVICE AND DOUBLE-SHAFT EXTRUDING DEVICE

[75] Inventors: Toshiro Iwata; Iwami Nagata; Akira Hatakeyama; Kazuhisa Nishigai, all of Saitama, Japan

[73] Assignee: Bridgestone Corporation, Tokyo, Japan

[21] Appl. No.: 141,022

[22] Filed: Oct. 26, 1993

[30] Foreign Application Priority Data

Oct. 26, 1992 [JP] Japan .................................. 4-287785
Nov. 16, 1992 [JP] Japan .................................. 4-328995

[51] Int. Cl.⁶ ...................................................... B29B 1/06
[52] U.S. Cl. ................................ 366/83; 366/88; 366/89
[58] Field of Search ........................... 366/266, 83, 84, 366/85, 86, 89, 90, 96, 97, 88, 300, 301, 323; 425/207

[56] References Cited

U.S. PATENT DOCUMENTS 2,693,617 11/1954 Weitzel .
3,901,486 8/1975 Matsui ................................. 366/90

FOREIGN PATENT DOCUMENTS

| 0305751 | 3/1989 | European Pat. Off. . |
| 962745 | 4/1957 | Germany . |
| 236920 | 2/1990 | Japan . |
| 749919 | 6/1956 | United Kingdom . |
| 2053780 | 2/1981 | United Kingdom . |

*Primary Examiner*—Robert W. Jenkins
*Attorney, Agent, or Firm*—Sughrue, Mion, Zinn, Macpeak & Seas

[57] ABSTRACT

A screw for a double-shaft extruding device having a shaft and a spiral flight provided at an outer periphery of the shaft. A height of the flight from an axis of the shaft is substantially constant. An angle of torsion of a spiral of the flight becomes smaller toward a shaft distal end. A cross-sectional area of extrusion formed by the shaft and the flight continuously increases from the shaft distal end to a shaft proximal end. Material can be smoothly discharged and completely extruded.

12 Claims, 7 Drawing Sheets

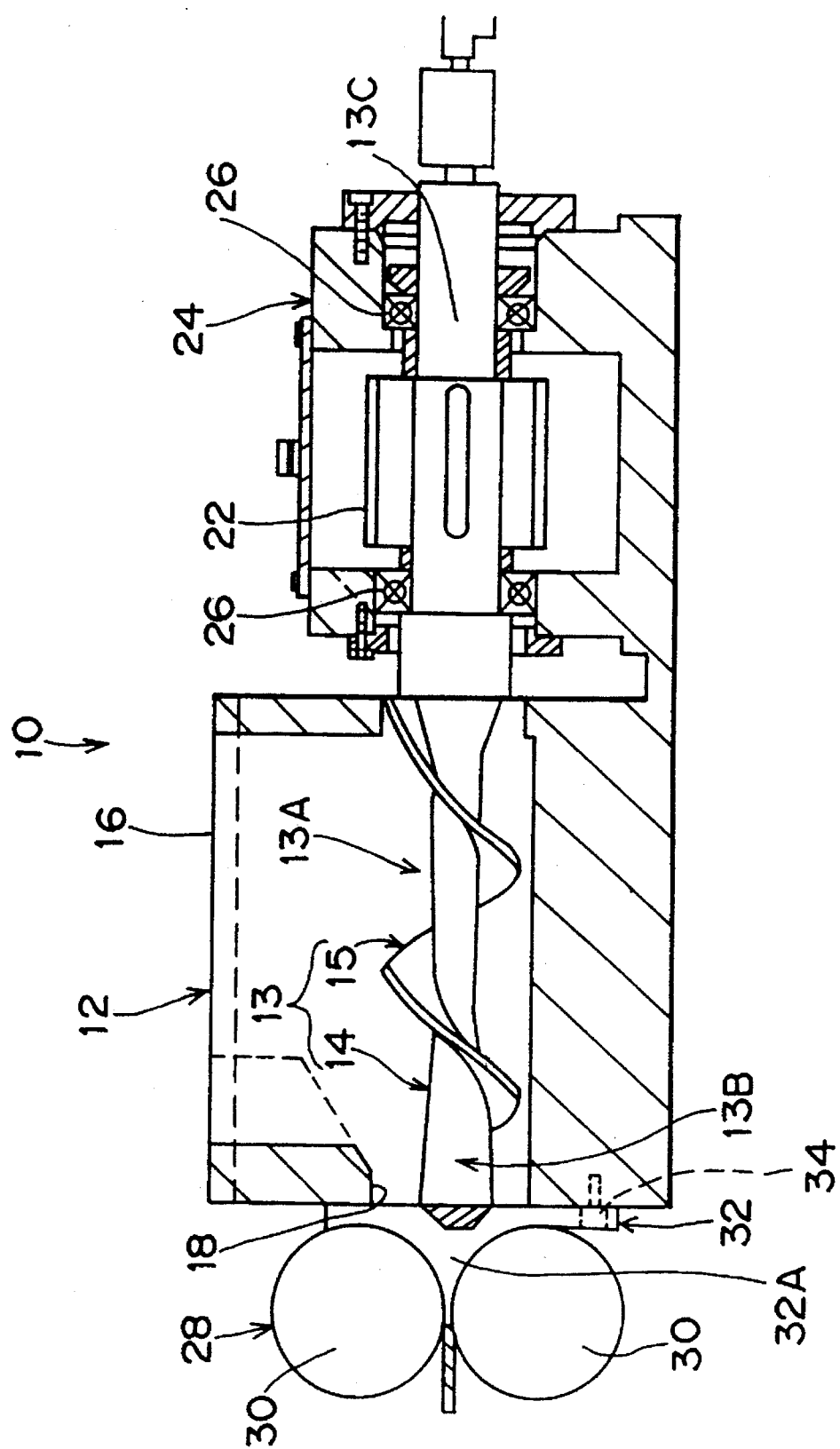

SCREW FOR DOUBLE-SHAFT EXTRUDING DEVICE AND DOUBLE-SHAFT EXTRUDING DEVICE

BACKGROUND OF THE INVENTION

1. Field of the Invention

The present invention relates to a screw for a double-shaft extruding device and a double-shaft extruding device. In particular, it relates to a screw for a double-shaft extruding device and a double-shaft extruding device for extruding a material to be extruded, such as rubber or plastic, into a sheet form.

2. Description of the Related Art

An example of a double-shaft extruding device for extruding a material to be extruded, such as rubber or plastic, into a sheet form is disclosed in Japanese Patent Application Laid-Open No. 2-36920.

As illustrated in FIG. 6, in a double-shaft extruding device 70, screws 74 are supported horizontally and rotatably by a casing 72. A hopper 76 having a top opening is provided at the side of the casing 72 at the base portions of the screws.

A discharge opening 78, which is open in the axial direction of the screws, and a roller die 80, which is adjacent to the discharge opening 78, are provided at the side of the casing 72 at the distal ends of the screws. The portion of the screw 74 which opposes the hopper is a feed portion 74A, and the distal end portion of the screw 74 is a compression portion 74B.

Accordingly, a material to be extruded which is supplied from the hopper 76 is extruded from the discharge opening 78 by the rotating screw 74 via the feed portion 74A and the compression portion 74B. The material to be extruded is made into a sheet form by the roller die 80.

However, in the double-shaft extruding device 70, the cross-sectional area S of extrusion formed by a shaft 82 of the screw 74 and a flight 84 provided on the outer perimeter of the shaft 82 is, from a shaft distal end 82A to a shaft proximal end 84B, similar to graph A in FIG. 5. A region W, where the cross-sectional area S of extrusion hardly varies, exists at an area of a rotational angle of 300° to 540° from the shaft distal end along the flight 84. As a result, the discharge of the material to be extruded, such as rubber, is not smooth in the region W. Further, the material cannot be completely extruded, and some may remain in the interior of the device. Work is required to remove the remaining material, and productivity deteriorates. There is room for improvement with respect to the remaining and removal of the material to be extruded at the distal end portion of the shaft.

Conventionally, the distal end portion of the screw of an extruding device for extruding a material to be extruded, such as rubber or plastic, into a sheet form has generally been cone-shaped or bowl-shaped. The surface of the distal end portion of the screw is generally chrome plated. As a result, there are no convex and concave portions on the surface, that is the surface is smooth.

However, during the extruding operation, the screw itself is heated. Further, during the extruding process, the temperature of the screw rises due to friction between the screw and the material to be extruded. The temperature of the material to be extruded also rises, and the stickiness thereof increases. The material to be extruded therefore adheres to the surface of the distal end portion of the screw.

Because the roller die is located ahead of the screw, high pressure is applied to the screw distal end portion of the shaft distal end portion, and the material to be extruded remains thereat. The material to be extruded adhering to or remaining at the distal end portion of the screw presents a drawback.

Further, the extrusion work is effected in a single apparatus, and various materials to be extruded are extruded therein. Therefore, after the extrusion of one material has been completed, the next material is then extruded. If the previous material sticks to the distal end of the screw of the shaft distal end, the material becomes mixed with a different material, which presents a drawback with respect to the quality of the material.

As a result, in order to prevent the above-described drawback, each time a different material is extruded it is necessary to visually determine whether the previous material has adhered. If some material has adhered, manual removal thereof is necessary, which presents a drawback in terms of productivity.

SUMMARY OF THE INVENTION

In view of the aforementioned, an object of the present invention is to provide a screw for a double-shaft extruding device and a double-shaft extruding device in which a material can be discharged smoothly and extruded completely, and in which there is no need for an operation to remove the material so that productivity can be improved.

Further, an object of the present invention is to provide a distal end portion of a screw whose axial sectional configuration is such that material to be extruded does not adhere to a shaft distal end.

A first aspect of the present invention is a screw for a double-shaft extruding device, having a shaft and a spiral flight which is provided at an outer peripheral portion of the shaft continuously from a shaft distal end to a shaft proximal end and whose height from an axis of the shaft is substantially constant, a cross-sectional area of extrusion formed by the shaft and the flight continuously increasing from the shaft distal end to the shaft proximal end.

A second aspect of the present invention is a screw for a double-shaft extruding device, having: a shaft which tapers such that an axial radius of a distal end portion of the shaft becomes larger toward a distal end; and a spiral flight which is provided at an outer periphery of the shaft and whose height from an axis of the shaft is substantially constant, an angle of torsion of a spiral of the flight becoming smaller toward a shaft distal and, and a cross-sectional area of extrusion formed by the shaft and the flight continuously increasing from the shaft distal end to a shaft proximal end.

A third aspect of the present invention is a double-shaft extruding device having: two screws disposed such that respective axes of the screws are parallel, each of the screws being formed by a shaft whose distal end portion is tapered such that an axial radius of the distal end portion becomes larger toward a distal end, and by a spiral flight provided at an outer periphery of the shaft, a height of the flight from an axis of tile shaft being substantially constant, an angle of torsion of a spiral of the flight becoming smaller toward a shaft distal end, a cross-sectional area of extrusion formed by the shaft and the flight continuously increasing from the shaft distal end to a shaft proximal end; and a roller die disposed adjacent to a discharge opening provided in a vicinity of a distal end portion of the screw.

A fourth aspect of the present invention is a screw for a double-shaft extruding device, having a shaft and a spiral flight provided around the shaft, spiral grooves of a direction opposite a torsional direction of the flight being provided in a distal end portion of the shaft.

In accordance with the first aspect of the present invention, the screw for a double-shaft extruding device has a shaft and a spiral flight which is provided at the outer peripheral portion of the shaft continuously from the shaft distal end to the shaft proximal end and which has a substantially constant height from the axis of the shaft. A cross-sectional area of extrusion formed by the shaft and the flight increases continuously from the shaft distal end to the shaft proximal end. Therefore, a material to be extruded can be smoothly conveyed from the shaft proximal end to the shaft distal end by the rotation of the screw. Accordingly, the material to be extruded can be discharged smoothly and can be completely extruded. Because the material to be extruded does not remain On the screw, an operation for removing the material is not required, and productivity can be improved.

The screw for a double-shaft extruding device of the second aspect of the present invention is formed of a shaft, whose distal end portion is tapered such that an axial radius of the distal end portion becomes larger toward the distal end, and a spiral flight, which is provided at an outer periphery of the shaft. The height of the flight from the axis of the shaft is substantially constant. The angle of torsion of the spiral of the flight becomes smaller toward the shaft distal end. A cross-sectional area of extrusion formed by the shaft and the flight increases continuously from the shaft distal end to the shaft proximal end. Accordingly, the material to be extruded can be discharged smoothly and can be extruded completely. Because the material to be extruded does not remain on the screw, there is no need for an operation to remove the material to be extruded, and productivity can be improved. Further, the material to be extruded is easily taken in at the proximal end portions of the screws so that the filling of the material to be extruded at the proximal end portions can be carried out efficiently. The discharging ability can be greatly improved.

The double-shaft extruding device of the third aspect of the present invention is formed of a shaft, whose distal end portion is tapered such that an axial radius of the distal end portion becomes larger toward the distal end, and a spiral flight, which is provided at ah outer periphery of the shaft. The height of the flight from the axis of the shaft is substantially constant. The angle of torsion of the spiral of the flight becomes smaller toward the shaft distal end. A material to be extruded is discharged from a discharge opening by two parallel screws in which a cross-sectional area of extrusion formed by the shaft and the flight increases continuously from the shaft distal end to a shaft proximal end. The material to be extruded is then formed into a sheet form by a roller die. Accordingly, the discharging by the screws of the material to be extruded is smooth, and the material to be extruded can be completely extruded. As a result, the material to be extruded does not remain on the screws, and there is no need for an operation to remove the material to be extruded from the interior of the device. Productivity can thereby be improved. Further, the material to be extruded can be easily taken in at the proximal end portions of the screws. The filling of the material to be extruded at the proximal end portions of the screws can be carried out efficiently, and the discharge ability can be greatly improved.

In the screw for a double-shaft extruding device of the fourth aspect of the present invention, grooves are formed in the shaft distal end portion of the screw for the extruding device in a spiral form in a direction opposite to the torsional direction. By applying scattering force along the grooves to the material adhering to and remaining at the grooves, the adhering of the material can be prevented.

Because the screw for a double-shaft extruding device and the double-shaft extruding device of the present invention have the structures described above, superior effects can be achieved in that the material to be extruded can be discharged smoothly and extruded completely, and work is not required to remove the material so that productivity can be improved. Further, the adhering of the material to the distal end portion of the screw is prevented so that the material to be extruded can be discharged smoothly and extruded completely. Work is not required to remove the material, and productivity can be improved.

BRIEF DESCRIPTION OF THE DRAWINGS

FIG. 2 is a side sectional view illustrating the screw for a double-shaft extruding device and the double-shaft extruding device of the embodiment of the present invention.

DESCRIPTION OF THE PREFERRED EMBODIMENT

An embodiment of the present invention will be described in accordance with FIGS. 1 through 5.

Figure 1:
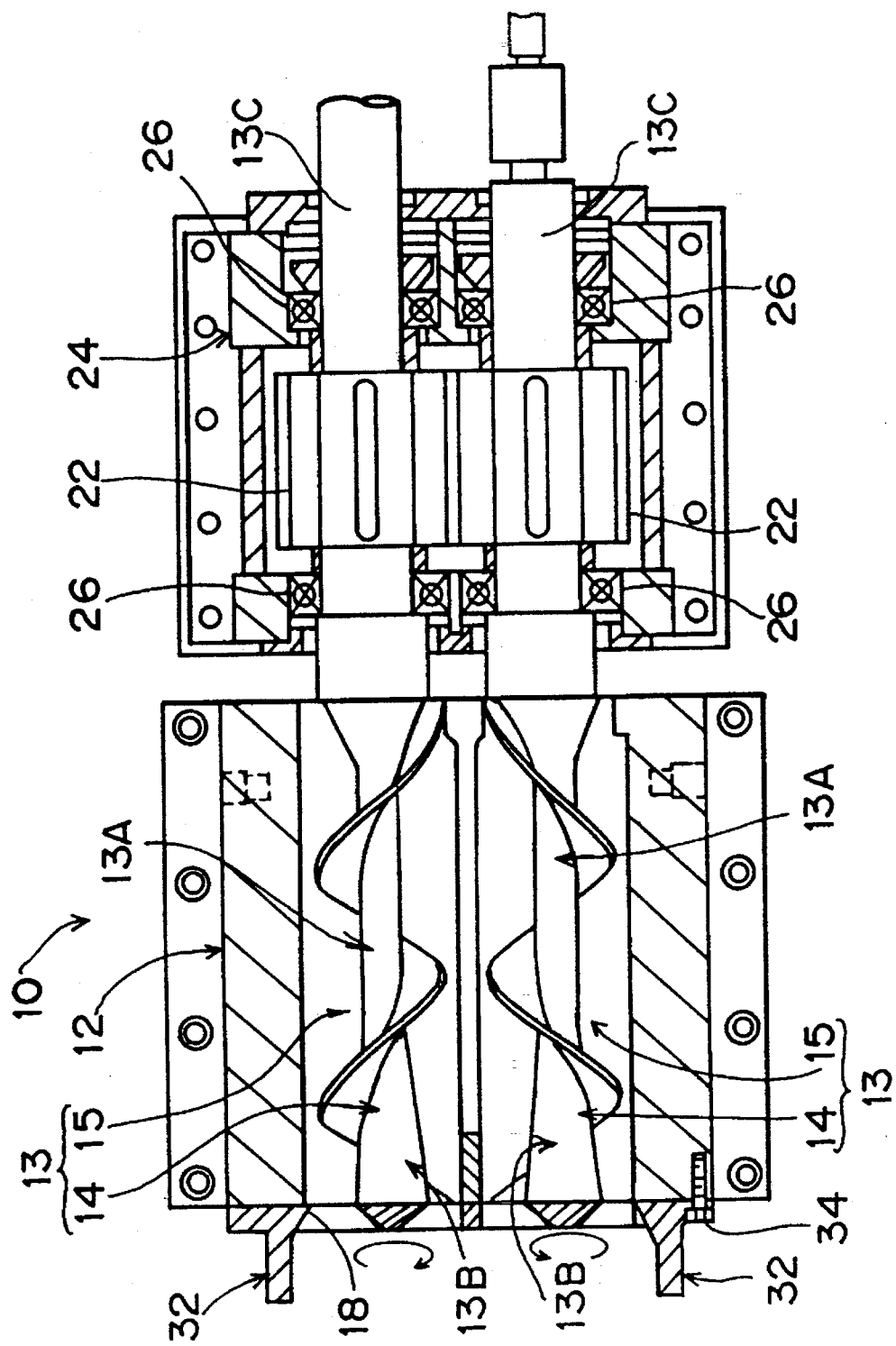
FIG. 1 is a plan view illustrating a screw for a double-shaft extruding device and a double-shaft extruding device of an embodiment of the present invention.

As illustrated in FIG. 1, two screws 13 are rotatably disposed to be parallel to each other within the same horizontal plane in a cylindrical casing 12 of a double-shaft extruding device 10 of the present embodiment.

Figure 3A:
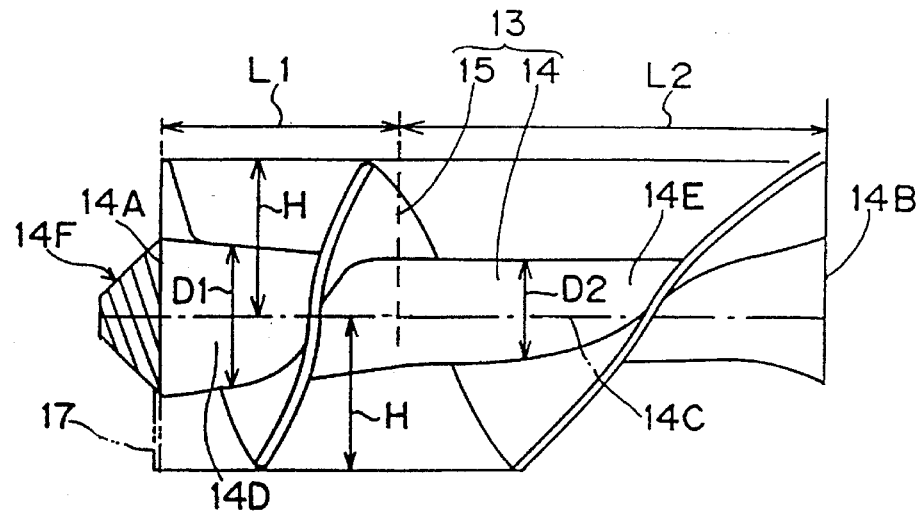
FIG. 3A is a side view illustrating the screw for a double-shaft extruding device of the embodiment of the present invention.

As shown in FIG. 3A, the screw 13 is provided with a shaft 14 and a spiral flight 15. The flight 15 is provided at the outer peripheral portion of the shaft 14 continuously from a shaft distal end 14A to a shaft proximal end 14B such that a height H of the flight 15 from an axis 14C of the shaft 14 is substantially constant. The respective flights 15 of the two screws 13 turn in opposite directions.

A distal end portion 14D (over a length L1) of the shaft 14 tapers such that the axial radius D1 thereof becomes greater in the direction of the distal end. An axial radius D2 of a proximal end portion 14E (over a length L2) of the shaft 14 is substantially constant and only tapers in a vicinity of the proximal end so as to become greater in the direction of the proximal end.

Figure 3B:
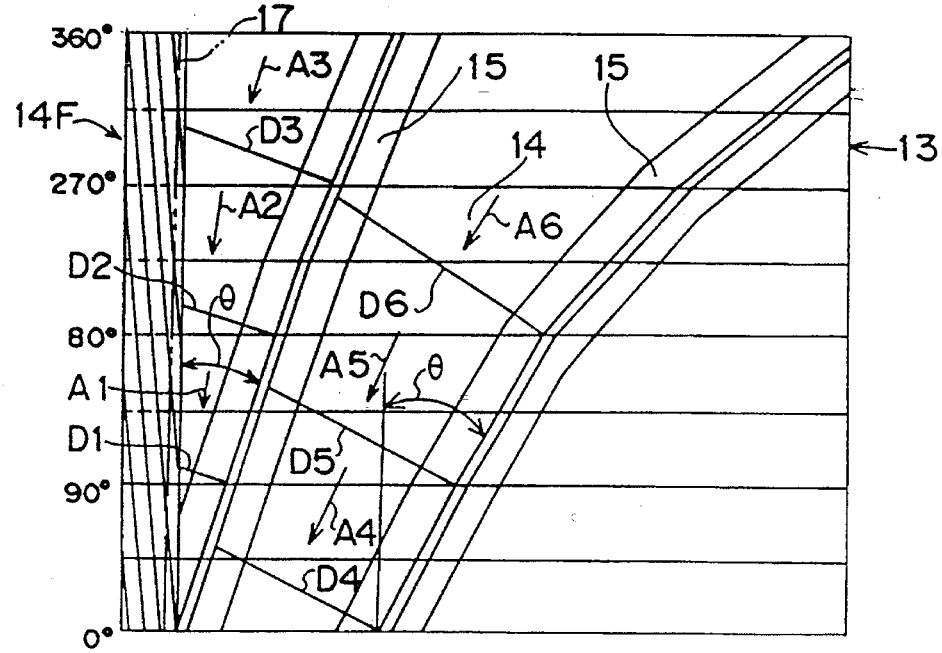
FIG. 3B is an unfolded view illustrating the screw for a double-shaft extruding device of the embodiment of the present invention.

As illustrated in FIG. 3B, the angle of torsion θ of the spiral of the flight 15 becomes smaller in the direction of the distal end of the shaft 14. The areas of the planes D1, D2, . . . D6, which are formed by the two opposing flights 15 and the shafts 14 and which are orthogonal to the conveying directions of the material to be extruded (the directions of arrows A1, A2, . . . A6 in FIG. 3B), continuously become greater from the shaft distal end 14A to the shaft proximal end 14B. Specifically, the cross-sectional area S of extrusion formed by the shaft 14 and the flight 15 continuously becomes greater from the shaft distal end 14A to the shaft proximal end 14B, as illustrated by graph B in FIG. 5.

At the area of the distal end port,ion of the flight 15 for one rotation of the shaft 14, the cross-sectional area S of extrusion is the area of the planes D1, D2, D3 which are orthogonal to the conveying directions of the material to be extruded (the directions of arrows A1, A2, A3 in FIG. 3B) and which are formed by the shaft 14, the flight 15 and an imaginary flight 17 provided at the shaft distal end 14A to be orthogonal to the axis 14C of the shaft 14.

As illustrated in FIG. 3A, a head portion 14F of the shaft 14 which projects from the shaft distal end 14A of the screw 13 is formed as a truncated cone.

Figure 4A:
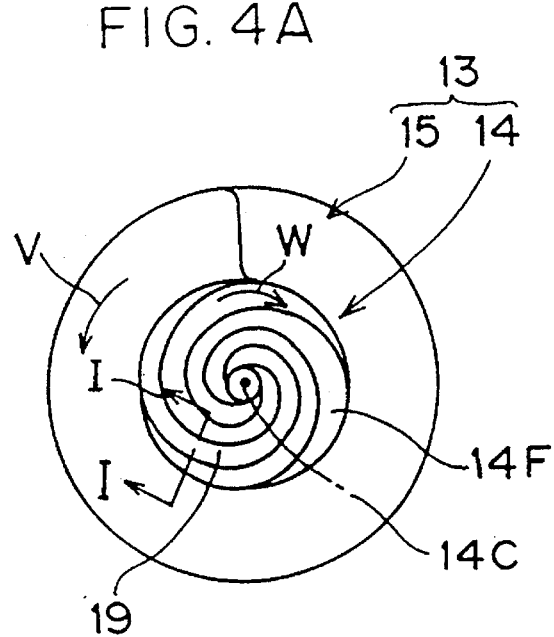
FIG. 4A is a front view illustrating a distal end portion of the screw for a double-shaft extruding device of the embodiment of the present invention.
Figure 4B:
FIG. 4B is a sectional view taken along line I—I of FIG. 4A.

As shown in FIG. 4A, grooves 19, each having an arc-shaped sectional configuration (see FIG. 4B), are formed in the head portion 14F of the screw 13 for an extruding device in a swirl around the axis 14C in a direction (the direction of arrow W in FIG. 4A) opposite to the direction of turning of the flight 15 (the direction of arrow V in FIG. 4A).

As shown in FIG. 3B, the direction of the grooves of the head portion 14F is opposite the torsional direction of the flight 15. The area of the head portion 14F is also large. As a result, a spiral groove is formed in the shaft distal end portion of the screw for an extruding device in the direction opposite to the torsional direction of the flight. By applying scattering force along the grooves to material which adheres to and remains in the grooves, the adhering of the material can be prevented.

Figure 4C:
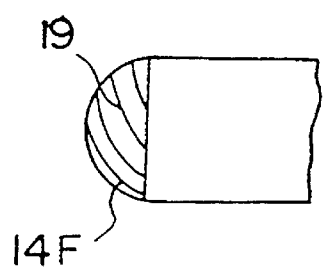
FIGS. 4C, 4D illustrate distal end portions of the screw for a double-shaft extruding device of the embodiment of the present invention.
Figure 4D:
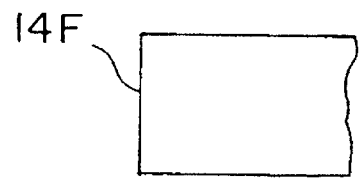
Figure 5:
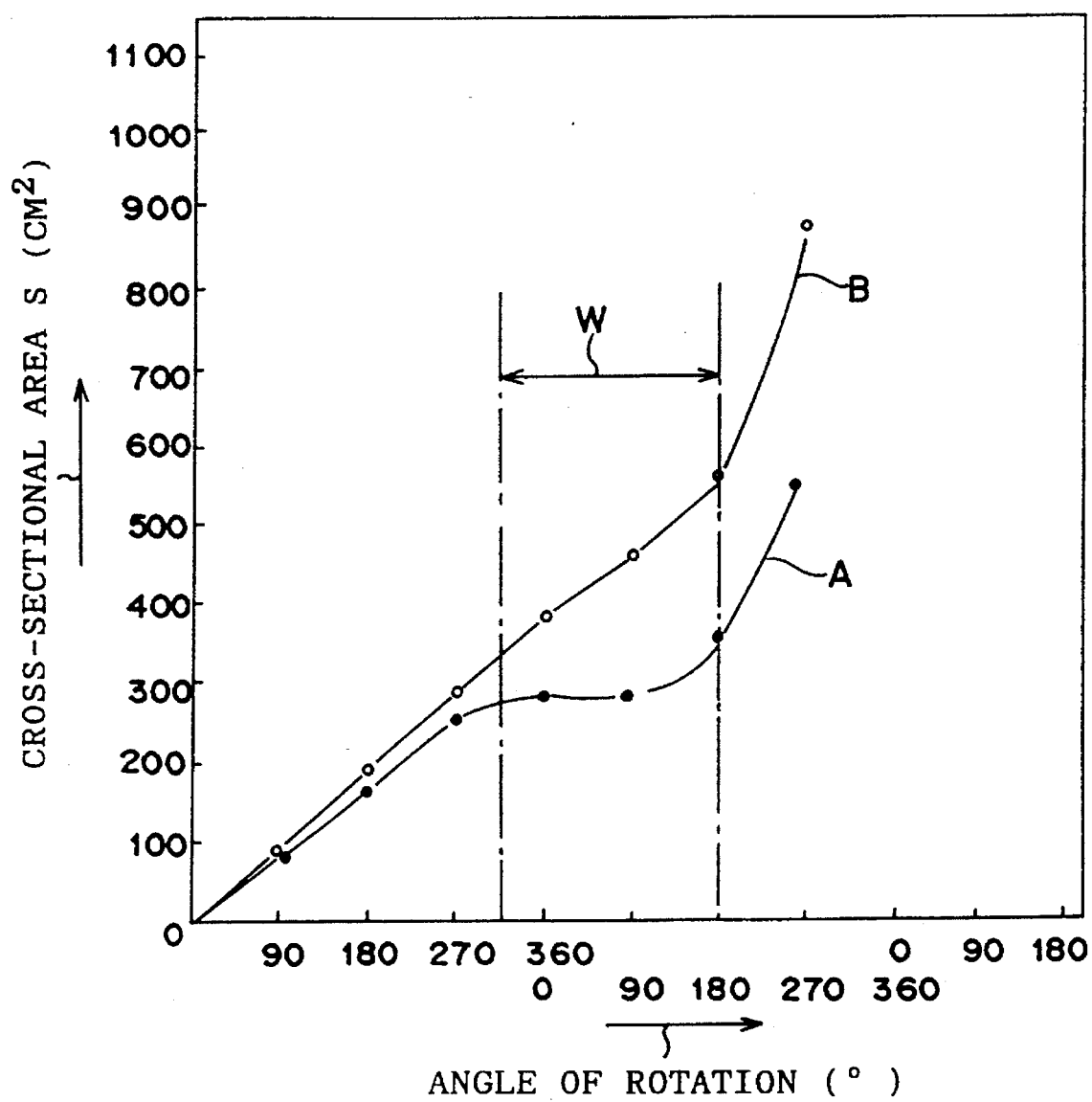
FIG. 5 is a graph illustrating a relationship between an angle along a flight of the screw for a double-shaft extruding device and a cross-sectional area of extrusion.
Figure 6:
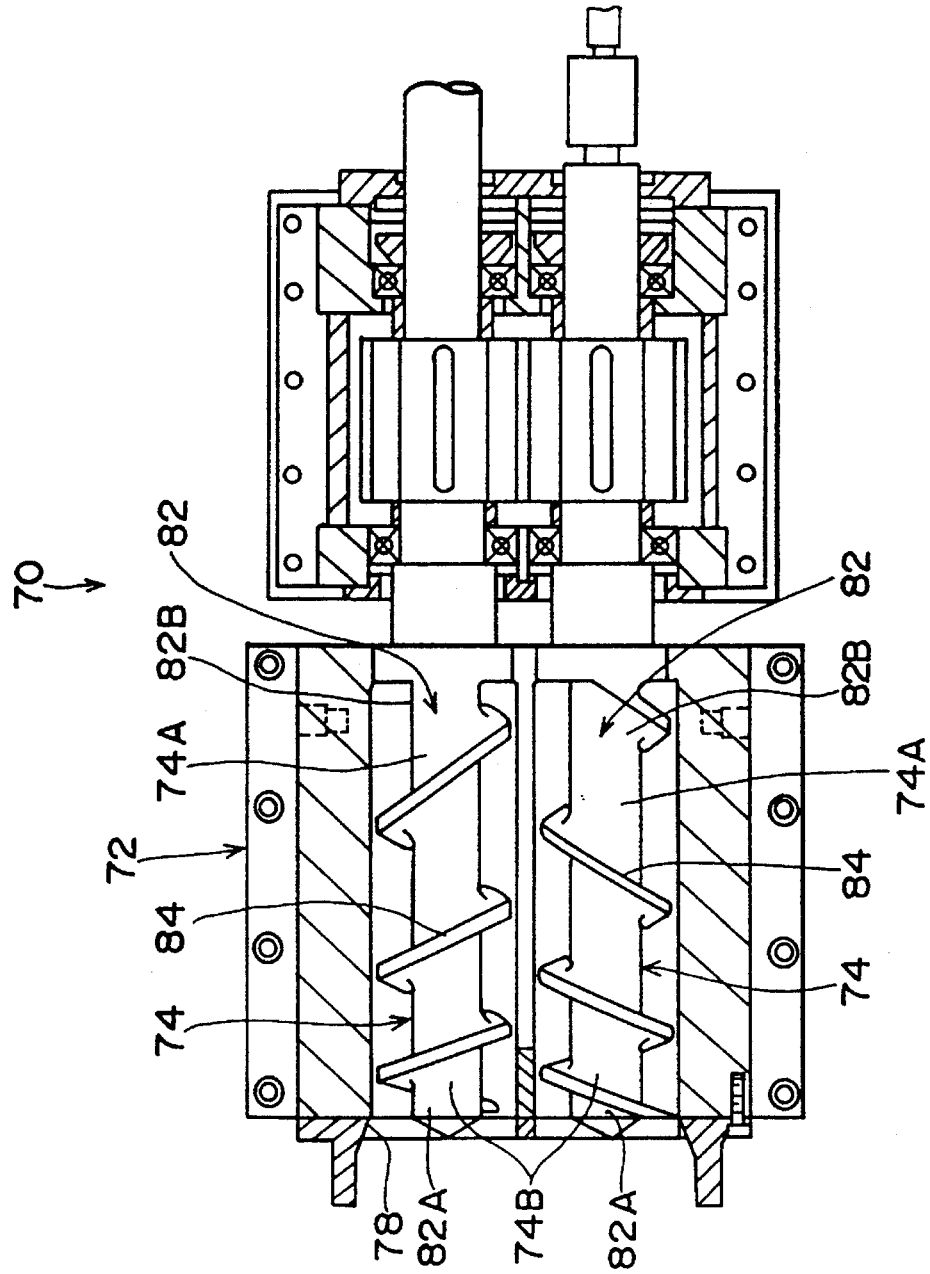
FIG. 6 is a plan sectional view illustrating a conventional screw for a double-shaft extruding device and a conventional double-shaft extruding device.
Figure 7:
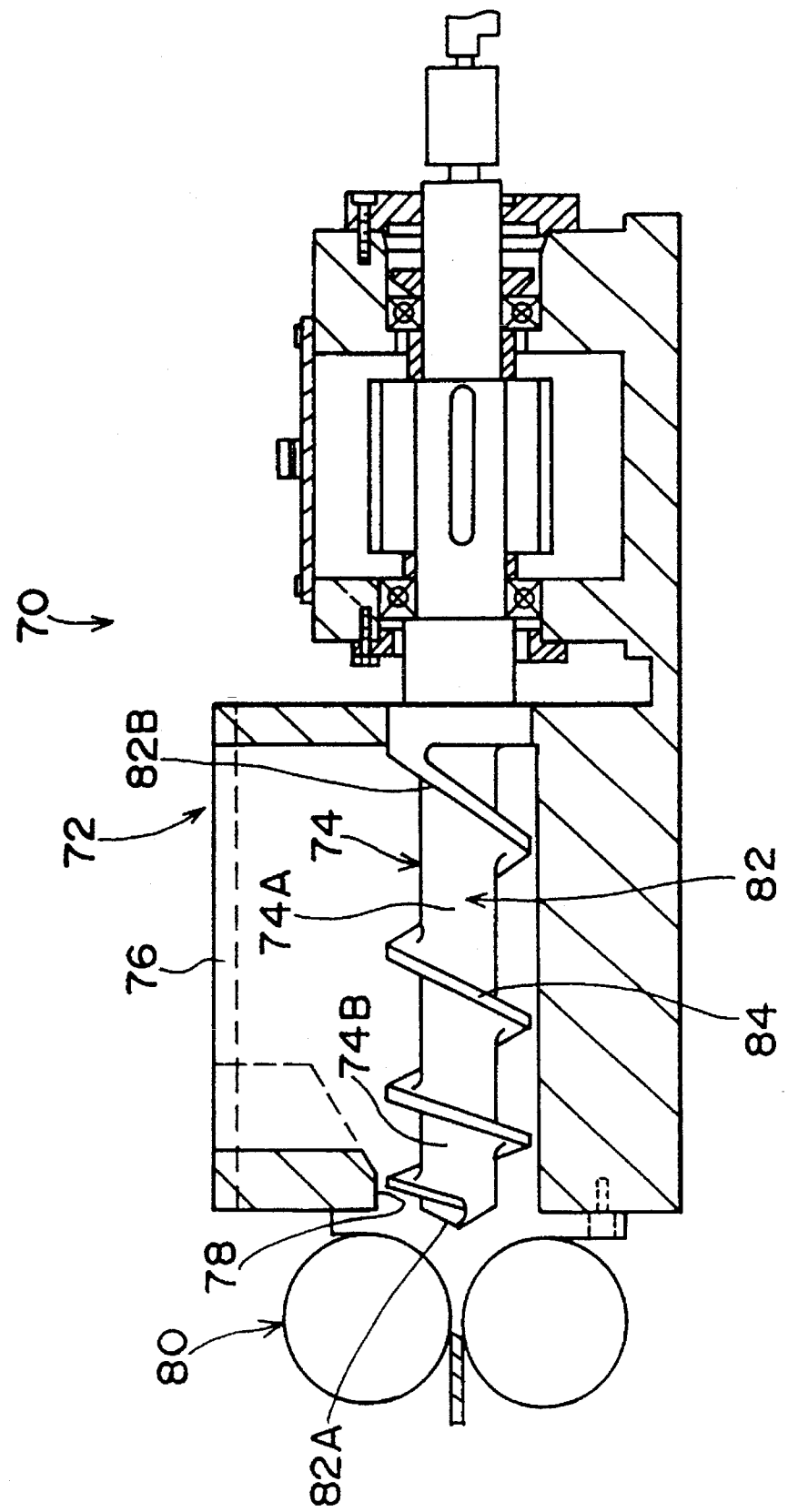
FIG. 7 is a side sectional view illustrating a conventional screw for a double-shaft extruding device and a conventional double-shaft extruding device.

The distal end portion may be formed as a bowl-shape, as illustrated in FIG. 4C, or may be shaped as a flat board, as illustrated in FIG. 4D. The spiral grooves 19 illustrated in FIG. 4A are provided on the surface of the head portion 14F of FIG. 4D.

As illustrated in FIG. 2, a hopper 16 having a top opening is provided at the side of the cylindrical casing 12 at the proximal end portion of the screw 13. A discharge opening 18, which is open in the direction of the axis 14C of the shaft 14 of the screw 13, is provided in the cylindrical casing 12 at the distal end portion of the screw 13.

The portion of the screw 13 which opposes the hopper 16 is a feed portion 13A. The feed portion 13A corresponds to the proximal end portion 14E (over the length L2) of the shaft 14 (see FIG. 3A). The distal end portion of the screw 13 is a compression portion 13B which corresponds to the distal end portion 14D (over the length L1) of the shaft 14 (see FIG. 3A).

The hopper 16 is disposed to extend over the respective feed portions 13A of the two screws 13. The respective outer peripheries of the compression portions 13B are covered by the inner peripheral wall of the cylindrical casing 12.

As illustrated in FIG. 1, respective base portions 13C of the screws 13 project from the cylindrical casing 12. Gears 22 are provided on the portions which project. The gears 22 mesh with each other. Further, the respective base portions 13C of the screws 13 are supported to a gear case 24 at two places via bearings 26. The end portion of the base portion 13C of one of the screws 13 is connected to a driving device (unillustrated).

Accordingly, the two screws 13 are rotated at the same speed in opposite directions. The directions of rotation are directions in which the material to be extruded, which is supplied from the hopper 16, is taken in between the two screws 13. The directions of rotation of the two screws 13 are directions which convey the taken in material to be extruded toward the discharge opening 18 side.

As illustrated in FIG. 2, a roller die 28 is disposed ahead of the discharge opening 18 at a slight distance from the discharge opening 18. The roller die 28 is formed by a pair of rollers 30 which are disposed vertically such that the horizontal axes thereof are orthogonal to the axial direction of the screws 13. The rollers 30 are driven by a driving device (unillustrated).

The respective axial direction lengths of the rollers 30 are slightly longer than the width of the discharge opening 18 in a direction orthogonal to the axis 14C of the shaft 14. Side guides 32, which prevent the material to be extruded from flowing out from the discharge opening 18 in transverse directions, are provided at both end portions of the rollers 30 in a direction orthogonal to the axis 14C of the shaft 14. The side guides 32 are fixed to the front surface of the cylindrical casing 12 by bolts 34 or the like. A front portion 32A of the side guide 32 is formed as a curved surface which runs along the peripheral surface of the roller 30.

Next, operation of the first preferred embodiment will be described.

In the double-shaft extruding device 10 of the present embodiment, the material to be extruded, such as rubber or the like, which is supplied to the hopper 16 is taken in by the feed portions 13A of the two screws 13 which are rotating in opposite directions and in directions of taking in the material to be extruded. The material to be extruded is conveyed to the compression portions 13B at the distal end side by the flights 15 of the feed portions 13A, and the pressure increases. The material to be extruded, which is subject to the increased pressure, is extruded into a sheet form from the discharge opening 18 via the roller die 28.

In the double-shaft extruding device 10 of the present embodiment, the distal end portion 14D (over length L1) of the shaft 14 of the screw 13 (see FIG. 3) tapers such that the axial radius D1 thereof becomes larger toward the distal end. Due to the optimal value of the angle of torsion θ of the flight 15, the relation between the rotation angle around the shaft 14 and the cross-sectional area S of extrusion always varies smoothly as illustrated by graph B in FIG. 5. There is no region W in which the cross-sectional area S of extrusion does not vary, as there is in the conventional art (graph A). As a result, the material to be extruded can be smoothly discharged and completely extruded. Therefore, material to be extruded does not remain on the screws 13, and there is no need for an operation to remove the material to be extruded. Productivity can thereby be improved.

Further, the angle of torsion θ of the spiral of the flight 15 becomes small toward the distal end of the shaft 14. The cross-sectional area S of extrusion which is formed by the shaft 14 and the flight 15 continuously increases from the shaft distal end 14A to the shaft proximal end 14B. Accordingly, the material to be extruded is easily taken in at the proximal end portions of the screws 13, i.e., at the feed portions 13A. The filling of the material to be extruded at the distal end portions of the screws 13, i.e., at the compression portions 13B, can be effected efficiently. The discharge ability greatly improves.

In the double-shaft extruding device 10 of the present embodiment, at the head portion 14F of the shaft 14 of the screw 13, the grooves 19, having arc-shaped sectional configurations and turning in a direction (the direction of arrow W in FIG. 4A) opposite to the direction of turning of the flight 15 (the direction of arrow V in FIG. 4A) are formed in a vortex shape around the axis 14C. Therefore, the material to be extruded separates easily from the head portion 14F of the shaft 14 of the screw 13, and the adhering of the material to be extruded to the head portion 14F can be prevented.

What is claimed is:

1. A screw for a double-shaft extruding device, comprising:

a shaft; and a spiral flight provided at an outer peripheral portion of said shaft continuously from a shaft distal end to a shaft proximal end and whose radial height outward from an axis of said shaft is substantially constant, a cross-sectional area of extrusion located between said shaft distal and proximal ends continuously increasing in area from the shaft distal end to the shaft proximal end.

2. A screw for a double-shaft extruding device according to claim 1, wherein an angle in torsion of a spiral of said flight decreasing smaller toward the shaft distal end.

3. A screw for a double-shaft extruding device according to claim 1, wherein a distal end portion of said shaft is tapered such that an axial radius of the distal end portion becomes larger toward the shaft distal end.

4. A screw for a double-shaft extruding device according to claim 1, wherein spiral grooves of a direction opposite a torsional direction of said flight are formed in a distal end portion of said shaft.

5. A screw for a double-shaft extruding device according to claim 4, wherein said spiral grooves are concave portions which each have an arc-shaped cross-section.

6. A screw for a double-shaft extruding device according to claim 1, wherein a distal end portion of said shaft is formed as a truncated cone.

7. A screw for a double-shaft extruding device, comprising:

a shaft which tapers such that an axial radius of a distal end portion of said shaft becomes larger toward a distal end; and a spiral flight provided at an outer periphery of said shaft and whose radial height outward from an axis of said shaft is substantially constant, an angle of torsion in a spiral of said flight decreasing toward a shaft distal end, and a cross-sectional area of extrusion located between said shaft distal end and said shaft proximal end continuously increasing in area from the shaft distal end to a shaft proximal end.

8. A screw for a double-shaft extruding device, comprising:

a shaft; and a spiral flight provided around said shaft, spiral grooves oriented in a direction opposite a torsional direction of said flight and being provided in a distal end portion of said shaft.

9. A screw for a double-shaft extruding device according to claim 8, wherein said spiral grooves are concave portions which each have an arc-shaped cross-section.

10. A screw for a double-shaft extruding device according to claim 8, wherein the distal end portion of said shaft is formed as a truncated cone.

11. A screw for a double-shaft extruding device according to claim 8, wherein the distal end portion of said shaft has rounded shape.

12. A screw for a double-shaft extruding device according to claim 8, wherein the distal end portion of said shaft has a flat face.

\* \* \* \* \*